July 8, 1952 P. T. LEAHY 2,602,296
ROTARY HYDRAULIC COUPLING
Filed April 9, 1947 2 SHEETS—SHEET 1

INVENTOR.
PATRICK T. LEAHY
BY Richey & Watts
ATTORNEYS

July 8, 1952          P. T. LEAHY          2,602,296
ROTARY HYDRAULIC COUPLING

Filed April 9, 1947          2 SHEETS—SHEET 2

INVENTOR.
PATRICK T. LEAHY
BY *Richey & Watts*
ATTORNEYS

Patented July 8, 1952

2,602,296

UNITED STATES PATENT OFFICE 2,602,296

ROTARY HYDRAULIC COUPLING

Patrick T. Leahy, Cleveland, Ohio, assignor to George F. Metzger and Gilbert T. Leahy, Cleveland, Ohio Application April 9, 1947, Serial No. 740,332

4 Claims. (Cl. 60—54)

This invention relates to improvements in hydraulic transmissions of the type adapted to facilitate clutching and braking actions.

The primary object of the invention is to construct an apparatus which may serve as a transmission to pick up loads slowly irrespective of the speed of the driving element and act to put in motion the driven element within a relatively short space of time.

Another object of the invention is to provide a series of passageways within the transmission housing which are arranged to effect the circulation of the fluid from one end of the case to the other and thus minimize foaming of the fluid.

Further objects of the invention reside in the provision of a structure which is silent of operation, economic of manufacture, simple of construction and efficient of operation.

Other objects and advantages more or less ancillary to the foregoing and the manner in which all the various objects are realized will appear in the following description, which, considered in connection with the accompanying drawings, sets forth the preferred embodiment of the invention.

Referring to the drawings.

Figure 1:
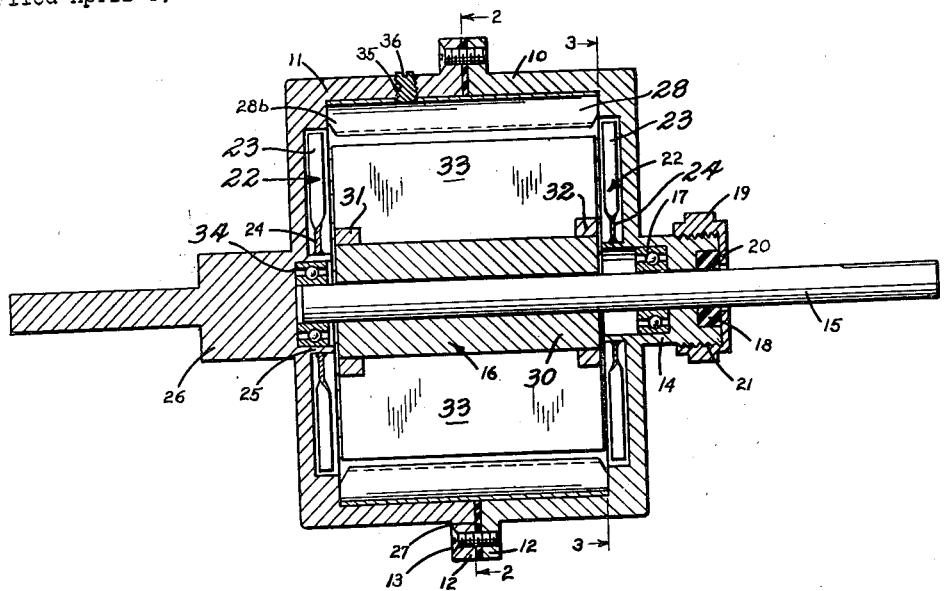
Fig. 1 is a vertical longitudinal section through the improved hydraulic transmission.
Figure 2:
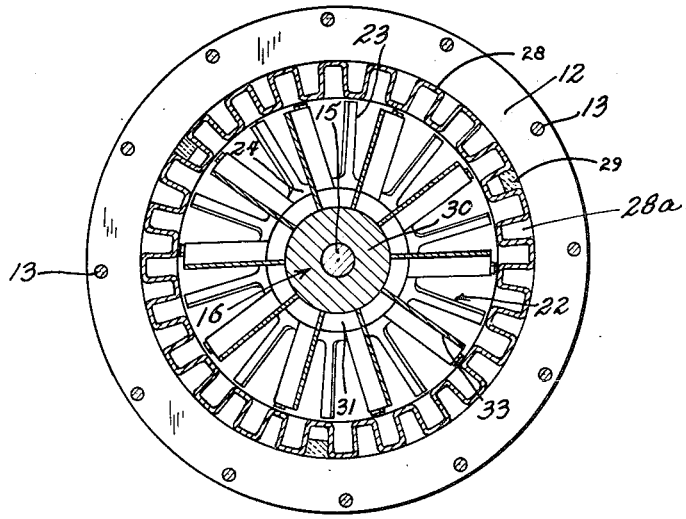
Fig. 2 is a transverse section of the transmission illustrated in Fig. 1, the section being taken on a plane indicated by line 2—2 in Fig. 1.
Figure 3:
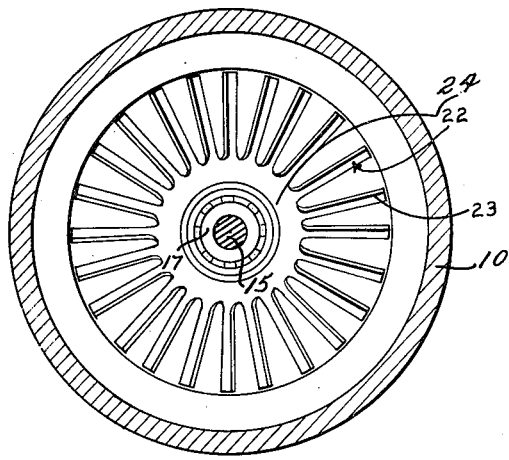
Fig. 3 is a transverse section through the transmission, the section being taken on a plane indicated by line 3—3 in Fig. 1.

Referring first to Fig. 1, the transmission comprises a pair of cylindrical housing elements 10 and 11 formed with companion flanges 12 drilled for the reception of bolts or cap screws 13. The housing member 10 is formed with a boss 14 in the center thereof which is bored to receive the power input shaft 15 of the rotor 16 and counterbored to receive an anti-friction bearing 17 and packing 18. The free end of the boss 14 is provided with a packing gland 19 which is formed with a flange 20 engageable with the packing 18 when drawn into an intimate engagement therewith through the threads 21. The inner face of the end walls of the housing members 10 and 11 are counterbored to receive spiders 22 formed as illustrated in Fig. 3 with radially disposed vanes 23 constituting baffles or scuppers bent to resist the flow of fluid circulated thereover in order to increase the pressure exerted by the fluid upon the housing members. The hub portions 24 of spiders 22 are welded or otherwise affixed to a boss 25 defining the inner wall of the counterbored seat for the spiders.

The housing member 11 is formed with a boss terminating in a shaft 26 in the center of the outer wall thereof disposed in axial alignment with the drive shaft 15. The end portion of the boss 26 is of a reduced diameter and constitutes the power output or driven shaft of the transmission mechanism. The housing members 10 and 11 are machined with bores of equal diameter in order to support a fluted baffle 28 which is anchored therein against rotative movement by lugs 29 welded to the inner wall of the housing members between the flutes of the baffle 28. The lugs are preferably of rectangular cross section in order to accommodate longitudinal separation of the housing members.

Figure 4:
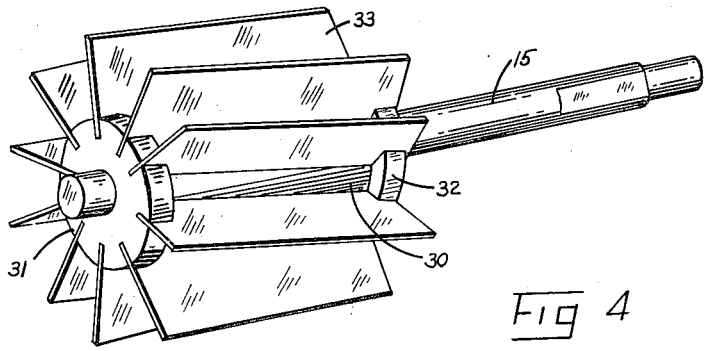
Fig. 4 is a view in perspective of the rotor and power input drive shaft.

The baffle may be formed as indicated from a sheet metal plate or cast to provide similar longitudinal grooves in the wall thereof or machined from a solid ring. The rotor comprises a hub 30 bored for the reception of the drive shaft 15 and formed with flanged end portions 31 and 32 (Fig. 4) kerfed to receive blades 33 which are seated therein in fixed relation thereto. The blades are disposed in angular relation to the axis of the shaft 15 and the free ends of the longitudinal edges thereof are machined concentric with the crest of the lands of the fluted baffle 28. The flutes of the baffle 28 define longitudinal passageways 28a between the inner walls of the crests thereof and the cylindrical walls of the housing. The outer ends 28b of the crests of the flutes are chamfered to afford fluid communication between the chambered end walls of the housing members and the passageways 28a. Thus when the transmission is in operation, the angularly disposed blades 33 will force the fluid in housing into one end of the passageway 28a and out through the other end thereof thereby causing a continuous vortical flow of the fluid. The fluid flow, after leaving the turbine blades 28, is urged in the direction of the angulation of the impeller blades 33 by the general directional flow of the fluid leaving said impeller blades.

The vanes 23 located in the spider 22 at the end of the housing are set to resist the directional flow of the fluid leaving the path of the impeller blades 33 and the turbine blades 28. The blades 23 are shaped to direct the flow of the fluid outward toward the passage opening 28b.

The vanes 23 of the spider 22 located in the end housing opposite the said directional flow caused by said impeller blades are set to receive the fluid as it emerges from the passageways 28a and are shaped to assist the flow of the fluid toward the impeller blades 33. The shaft 15 is rigidly secured to the hub 30 of the rotor and the inner end of the shaft protrudes beyond the face of the flange 31 to provide a support for the rotor within the anti-friction bearing 34. The two housing members are assembled with the flanged faces thereof drawn into sealed relation with a gasket 27 and the chamber, defined by the bores in the housings, is then filled to approximately ninety per cent (90%) of its capacity with oil of the character generally employed in transmissions of this type. The oil or other transmission fluid may be injected into the chamber through an opening 35 which is sealed by a pipe plug 36.

In operation, the power applied through the drive shaft 15 effects the rotation of the rotor 16 which impels the oil within the housing against the baffle 28 by centrifugal action. The frictional drag produced in the oil by relative rotation of the rotor and the cylinder imparts energy from the rotor to the cylinder, thus obtaining the required coupling effect. The channels or passageways which open toward the rotor allow the oil thus discharged from the rotor to pass axially to the inlet end thereof, the inlet end of the rotor being that end which has the leading edge of the skewed vanes 33.

The angularity of the blades 33 tends to circulate a portion of the fluid axially against the adjacent runner blades 22, the impact force of the oil adding to the rotational energy imparted to the cylinder. The oil which has been discharged axially from the rotor is returned to the inlet end of the rotor through a set of passages 28a in the fluted baffle to the opposite end of the cylinder. By providing the closed channel, unrestricted and undisturbed axial return flow is achieved which improves the operation of the device since a vortical flow path is established.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

1. A fluid coupling comprising a closed cylinder constituting a runner, a rotor therein constituting an impeller, a drive shaft for the rotor, blades on said rotor disposed in angular relation to the axis of the rotor, a fluted cylindrical baffle on the inner circumferential wall of the cylinder defining passageways for axial flow of the fluid in said cylinder, a set of said passageways being open to radial flow from the rotor, and a second set of passageways open at each end to provide for axial flow of fluid discharged from the trailing ends of the rotor blades at one end of the cylinder to reenter the leading ends of the rotor blades at the opposite end of the cylinder.

2. A fluid coupling comprising a closed cylinder constituting a runner, a rotor therein constituting an impeller, a drive shaft for the rotor, blades on said rotor disposed in angular relation to the axis of the rotor, radial baffles in the end walls of the cylinder, a fluted cylindrical baffle on the inner circumferential wall of the cylinder defining passageways for axial flow of the fluid in said cylinder, a set of said passageways being open to radial flow from the rotor, and a second set of passageways open to flow from the radial baffles at one end of the cylinder for returning the oil discharged from said radial baffles to the radial baffles at the opposite end of the cylinder.

3. A fluid coupling comprising a closed cylinder constituting a runner, a rotor therein constituting an impeller, a drive shaft for the rotor, blades on said rotor disposed in angular relation to the axis of the rotor, radial baffles in the end walls of the cylinder, a fluted cylindrical baffle on the inner circumferential wall of the cylinder defining passageways for axial flow of the fluid in said cylinder, a set of said passageways each having a side open to radial flow from the rotor, and a second set of passageways having the ends thereof open to flow from the radial baffles at one end of the cylinder for returning the oil discharged from said radial baffles to the radial baffles at the opposite end of the cylinder.

4. A fluid coupling comprising a closed cylinder constituting a runner, a rotor therein constituting an impeller, a drive shaft for the rotor, blades on said rotor disposed in angular relation to the axis of the rotor, radial baffles in the end walls of the cylinder, a fluted cylindrical baffle on the inner circumferential wall of the cylinder defining passageways for axial flow of the fluid in said cylinder, a set of said passageways each having a side open to radial flow from the rotor, and a second set of passageways having the ends thereof open to flow from the radial baffles at one end of the cylinder for returning the oil discharged from said radial baffles to the radial baffles at the opposite end of the cylinder, said end wall baffles terminating in proximity with said passageways.

PATRICK T. LEAHY.

REFERENCES CITED

The following references are of record in the file of this patent:

UNITED STATES PATENTS

| Number | Name | Date |
|---|---|---|
| 1,636,050 | Föttinger | July 19, 1927 |
| 1,862,045 | Beaumont et al. | June 7, 1932 |
| 2,287,498 | Scofield | June 23, 1942 |

FOREIGN PATENTS

| Number | Country | Date |
|---|---|---|
| 6,233 | Great Britain | Mar. 10, 1897 |
| 16,785 | Great Britain | July 18, 1912 |
| 271,380 | Great Britain | May 26, 1927 |
| 310,377 | Great Britain | July 10, 1930 |